United States Patent [19]

Rufus-Isaacs

[11] Patent Number: 5,060,079
[45] Date of Patent: Oct. 22, 1991

[54] APPARATUS FOR CONTROLLING TELEVISION MONITORING

[76] Inventor: Alexander Rufus-Isaacs, 110 Winnett Pl., Santa Monica, Calif. 90402

[21] Appl. No.: 503,311

[22] Filed: Mar. 30, 1990

[51] Int. Cl.⁵ .......................................... H04N 7/167
[52] U.S. Cl. ................................. 358/349; 455/26.1; 455/2; 358/84; 340/825.33; 307/141.4
[58] Field of Search .......................... 358/84, 85, 349; 340/825.33, 825.35; 380/23, 16; 455/2, 4, 5, 6, 26.1; 307/141, 141.4, 141.8

[56] References Cited

U.S. PATENT DOCUMENTS

| | | | |
|---|---|---|---|
| 3,879,332 | 4/1975 | Leone | 358/188 X |
| 4,246,495 | 1/1981 | Pressman | 358/188 X |
| 4,348,696 | 9/1982 | Beier | 358/349 X |
| 4,358,672 | 11/1982 | Hyatt et al. | 358/349 |
| 4,566,033 | 1/1986 | Reidenouer | 358/84 |
| 4,588,901 | 5/1986 | Maclay et al. | 307/141 |

Primary Examiner—Thomas H. Tarcza
Assistant Examiner—Tod Swann
Attorney, Agent, or Firm—Blakely, Sokoloff, Taylor & Zafman

[57] ABSTRACT

An arrangement for limiting the time an authorized viewer may view a television program on a television receiver including apparatus for sensing a value stored in a transportable magnetic medium, apparatus operating in response to the sensing of a value by the apparatus for sensing a value stored in a transportable magnetic medium for providing a signal indicative of the time remaining to the authorized viewer, apparatus responsive to an indication that time remains to the viewer to enable the transmission of television signals to a television receiver, and apparatus for reducing the signal indicating the time remaining to the viewer with the passage of time.

4 Claims, 2 Drawing Sheets

APPARATUS FOR CONTROLLING TELEVISION MONITORING

BACKGROUND OF THE INVENTION

1. Field of the Invention

This invention relates to apparatus for controlling access to television programming and, more particularly, to methods and apparatus for controlling the time any particular person may view television.

2. History of the Prior Art

There have been many reports that children view too much television, especially when the children are unsupervised. Our modern society which often requires that all of the adults in a family group have full time employment has to a great extent limited the ability of parents to supervise their children's viewing of television. Moreover, parents' attempts to limit the time that their children spend watching television are often arbitrary and lead to stress and quarrels within the family.

There have been attempts to provide apparatus that limit a person's ability to view television. For example, U.S. Pat. No. 4,566,033 discloses an arrangement including a timer using a reed switch and magnetic tokens which are used to provide power to a television set so that it may be viewed. This arrangement does not provide for multiple users, nor dies it identify authorized users. U.S. Pat. No. 4,348,696 discloses an arrangement including a microprocessor storing passwords which may be entered to turn on a television. Although this arrangement provides for multiple users, it does not provide for time limits or reward the users for cooperating in their viewing. U.S. Pat. No. 3,736,368 discloses an arrangement including circuitry for actuating a pay television channel through the use of a ticket inserted into a receptacle to change a resonant frequency. U.S. Pat. No. 3,798,362 discloses an arrangement including a timer for disabling a television program. U.S. Pat. No. 3,894,176 discloses an arrangement for distributing television to motel rooms under control of a key arrangement and for billing that distribution. U.S. Pat. No. 4,358,672 discloses an arrangement for providing pay television during particular time periods in response to a magnetically striped record. U.S. Pat. No. 3,890,461 discloses an arrangement for receiving pay television including a card or ticket reader which operates in response to a code to permit unscrambling of a television program. U.S. Pat. No. 4,718,107 discloses an arrangement including a circuitry for blocking various channels which may be viewed on a television set and having various home entry abilities.

In general, the pay television arrangements are much too complicated and expensive for use by parents, within the home. None of the arrangements proposed are directed particularly to controlling television use by children and encouraging responsibility and cooperation.

SUMMARY OF THE INVENTION

It is, therefore, an object of the present invention to provide an arrangement for controlling the access to and the amount of time which may be spent watching television.

Another more specific object of the present invention is to encourage cooperation between children watching television.

These and other objects of the present invention are realized in an arrangement for limiting the time an authorized viewer may view a television program on a television receiver comprising means for sensing a value stored in a transportable magnetic medium, means operating in response to the sensing of the value by the means for sensing a value for providing a signal indicative of the time remaining to the authorized viewer, means responsive to an indication that time remains to the viewer to enable the transmission of television signals to a television receiver, and means for reducing the signal indicating the time remaining to the viewer with the passage of time.

These and other objects and features of the invention will be better understood by reference to the detailed description which follows taken together with the drawings in which like elements are referred to by like designations throughout the several views.

DETAILED DESCRIPTION OF THE INVENTION

Figure 1:
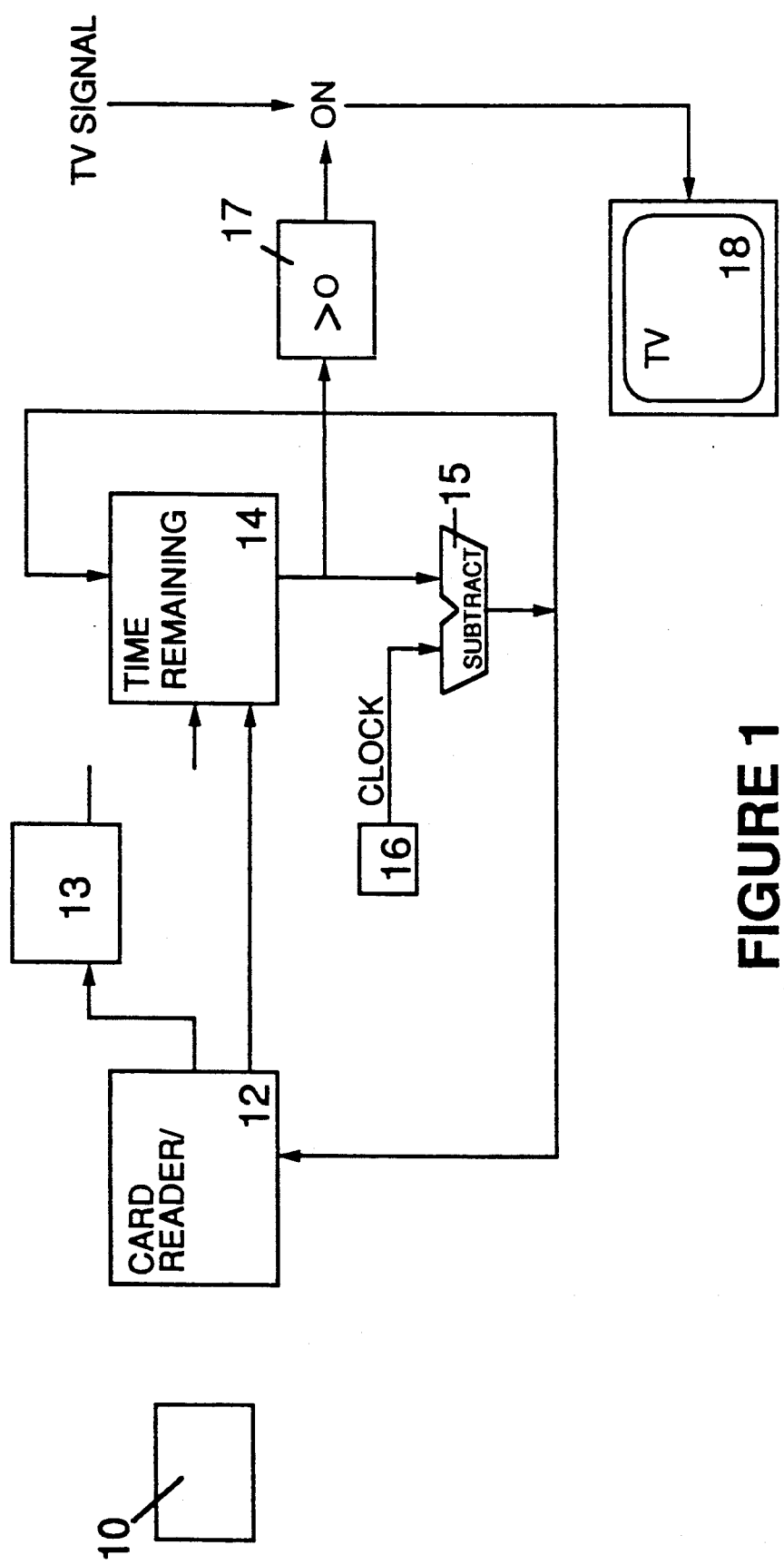
FIG. 1 is a block diagram illustrating a first arrangement designed in accordance with the invention.

Referring now to FIG. 1, there is illustrated a block diagram of the invention in its most basic form. The invention includes a magnetically programmable medium such as a card 10 which may be furnished by a parent to a child. The card, in this basic arrangement, has programmed into its magnetic material a prescribed period of time within which the child may view a television set over a given period. For example, the card may have a one hour period of time stored in the magnetic material. This value may be provided by a device for storing information on magnetic cards which is well known to the art and is not in itself a part of this invention.

Such a card 10 may be inserted into the apparatus of this invention to cause the television to be enabled by closing the connection between the power source or antenna or other means for receiving the television signals. The device senses that the card contains authorization to use the television for a prescribed period, connects the television during that period, and disables the television when the time for viewing has passed.

In FIG. 1, the card 10 is provided to a combined reader/writer circuit 12 which senses the amount of time remaining in the magnetically programmed area of the card 10. This area may include a total time for the period during which the child holds the card such as a day or a week, or the area may include a plurality of different times, for example, one period for each day. In the latter case, the magnetically programmed indication may include with each period of time an indication of the particular day (week, month) involved.

In any case, the card 10 is read by the card reader/writer 12; and if any time remains during the valid period, this time is transferred to a circuit 14 such as a register which stores the value of the time remaining. The value is also transferred to an enable circuit 13 which is used to allow the circuit 14 to operate only during a period in which the card 10 remains in the reader/writer circuit 12. The value in the circuit 14 is continually transferred to a subtractor circuit 15. In the subtractor circuit 15, a value furnished by a clock circuit 16 is subtracted from the value of the time remaining in the register 14, and the reduced value placed in the register 14. Thus, if a clock signal is furnished once each minute to the subtractor circuit 15, one minute is subtracted from the value of the time remaining in the register 14 each minute. Obviously, the values used for storing signals may be any convenient values normally used for the digital circuitry which is the type which would typically be used to implement such an arrangement; and the use of the terms minute, hour, and the like are not to be construed as limiting the arrangement to circuitry operating at those rates. For example, signals are likely to be stored in binary form and clock signals are likely to be measured in megacycles and counted down to realize the desired periods.

The value of the time remaining is also transferred to a comparator circuit 17. The comparator circuit 17 determines whether the value remaining in the time remaining register 14 is greater than zero. So long as the time remains greater than zero, the comparator furnishes a signal to enable the transmission of television signals from the source of television signals (an antenna or cable or the like) so that television programming is furnished to a television receiver 18.

The value of the signal furnished by the subtractor circuit 15 which indicates the total amount of time remaining to the person providing the card 10 is also relayed back to the card reader/writer circuit 12. This value may be used to update the value stored in the magnetic media of the card 10 on a continuous basis by subtracting time used.

Thus, it will be seen that the arrangement illustrated in FIG. 1 allows a chid to insert a card having a predetermined amount of viewing time stored within its magnetic media and to view the television monitor so long as time remains on the card. The value of the time remaining is constantly decremented as the card 10 remains in the card reader/writer circuit 12. When no more time remains on the card, the time remaining circuit 14 transfers this value to the comparator circuit 17 and the source of the television signals is disconnected from the television receiver thereby discontinuing the viewing.

Figure 2:
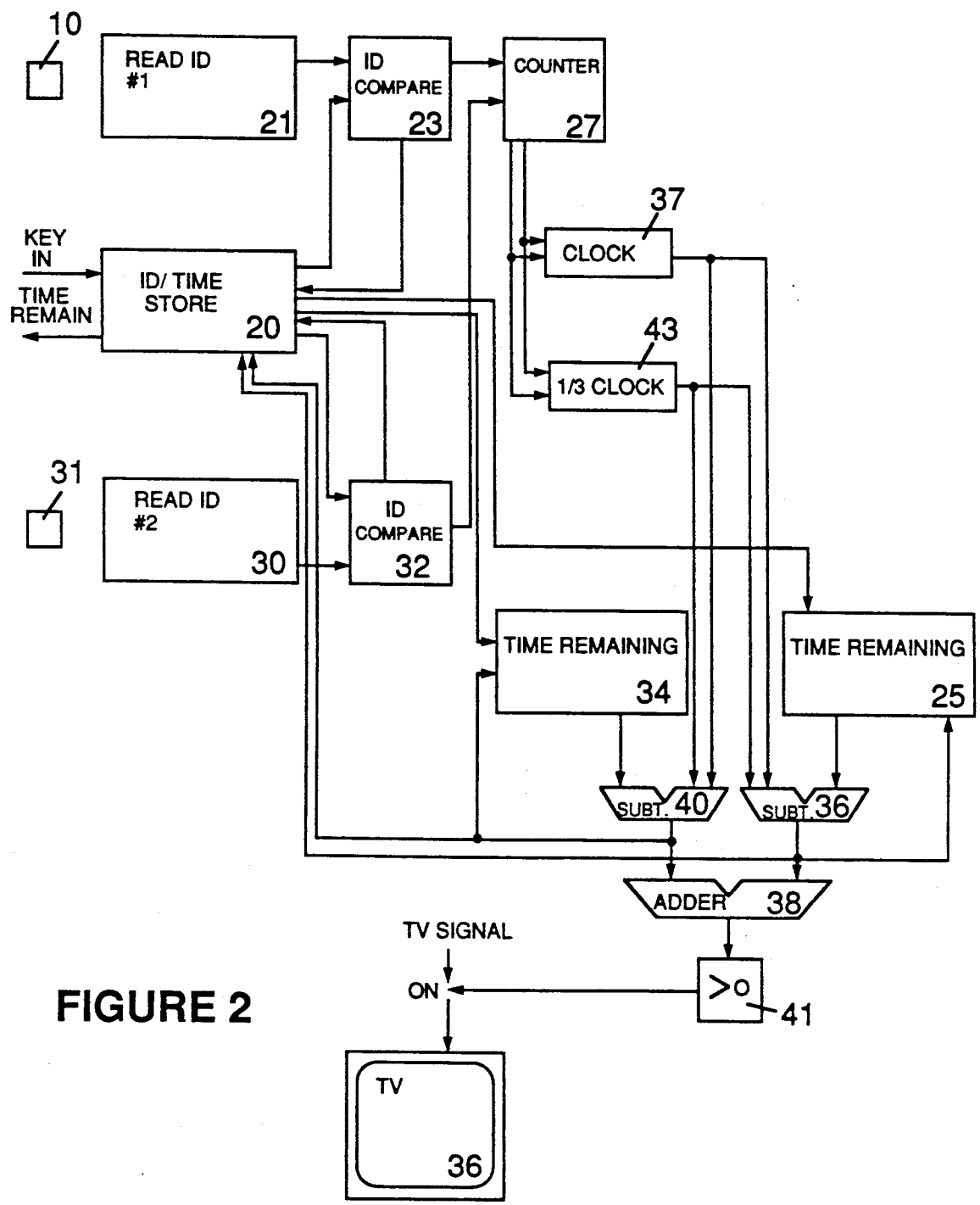
FIG. 2 is a block diagram illustrating a second arrangement in accordance with the invention.

FIG. 2 illustrates in block diagram form a second circuit constructed in accordance with the invention. The circuit of FIG. 2 allows more than one child to utilize the television receiver in a fashion which favors cooperation between the children by providing that if they cooperate, they are rewarded with a longer viewing period. The arrangement utilizes a magnetic medium carrying device such as a card 10 which may be used in the same manner as the arrangement illustrated in FIG. 1. However, the preferred embodiment of the invention uses a magnetic medium which includes only a user identification coding in the magnetic medium.

The arrangement of FIG. 2 includes an identification/time store circuit 20 which may be programmed in a conventional manner by a parent or other controlling user using a keyboard or other well known input device to store for each user a user identification and a time allotted for use by such user during a prescribed period. As with the circuit of FIG. 1, this time may include more than a single period by including a series of storage values indicating different periods and allotting time for each such period.

The card 10 of a user is inserted into a reader identification circuit 21 which reads the encoded reader identification. This value is transferred to an identification comparison circuit 23 which also receives input from the identification/time store circuit 20 indicating the various user codings stored therein. The identification comparison circuit 23 determines whether the identification/time store circuit 20 includes the identification of the user. This allows only those users which have their identifications preprogrammed into the cards and the identification/time store circuit 20 to operate the arrangement. A valid comparison by the circuit 23 is indicated to the identification/time store circuit 20 causing the value stored by the controlling user for that user to be transferred to a time remaining register 25. The identification comparison circuit 23 also transfers a signal to a counter circuit 27 which provides an output indicating how many users have furnished cards to the arrangement at the same time. The counter circuit 27 furnishes an output indicating that a single user is using the arrangement if only the card 10 is inserted in the reader identification circuit 21.

A second reader identification circuit 30 is adapted to receive a card 31 from another user at the same time that a card 10 is provided to the reader identification circuit 21. The reader identification circuit 30 transfers a signal providing the user identification to a identification comparison circuit 32 which also receives input from the identification/time store circuit 20. Upon a valid comparison with a user identification stored by the identification/time store circuit 10, the identification comparison circuit 32 provides a signal to the identification/time store circuit 20 causing the time allotted to the particular user to be transferred to a time remaining register 34 from the identification/time store circuit 20. The identification comparison circuit 32 also transfers a signal to the counter circuit 27 to increment the counter value if another user is using the arrangement at the same time.

The two halves of the arrangement illustrated operate in the same manner if only a single user is attempting to view the television receiver 36. In such a case, the value in the time remaining register 25, for example, is transferred to a subtractor circuit 36. The subtractor circuit 36 subtracts the value furnished by a clock input at each increment of time from the value furnished by the time remaining register 25. With a single card 10 inserted into one of the reader identification circuits 21 or 30, the clock produced is from a standard clock circuit 37 which is enabled by the counter circuit 27 when but a single card is inserted in reader identification circuit so that the count value is equal to one. This clock value (for example, one minute) is subtracted from the value furnished by the time remaining register 25 to give the time remaining to the user (e.g., minutes if the time is kept in that value).

The value in the subtractor circuit 36 is returned to the time remaining register 25 and to the identification/time store circuit 20 so that the time remaining to the user may be updated. This time is also furnished to an adder circuit 38 which also receives a value from a subtractor circuit 40. The values from the two subtractor circuits 36 and 40 are added and furnished to a comparator circuit 41. So long as the total of the time remaining values furnished by the adder circuit 38 is greater than zero, the comparator 41 enables the transfer of signals from the source of television signals to the television receiver 36.

The reader identification circuit 30 operates in the same manner to cause the identification/time store circuit 20 to provide a time remaining value for the particular user to the time remaining register 34 when a valid card 31 is inserted into the reader identification circuit 30 and time is stored for that user in the reader identification circuit 30. The value in the time remaining register 34 is transferred to the subtractor circuit 40 and decremented by a clock signal from the clock circuit 37 enabled by a value of one furnished by the counter 27. This time remaining is used to update the value in the time remaining register 34 and the identification/time store circuit 20. The remaining time value is also sent to the adder 38 where it is added to any value from the subtractor circuit 36 and transferred to the comparator circuit 41. When a card 10 or 31 is the only card activating the arrangement, the single time is merely transferred by the adder 38 and the time of only one card is transferred to the comparator circuit 41 to control the energization of the television system.

However, in order to persuade viewers to cooperate in viewing the television, the arrangement is provided with a means for rewarding viewers. In the preferred embodiment, when two cards (obviously, there might be more than two input arrangements) are inserted into reader identification circuits 21 and 30 simultaneously, the identification comparison circuits 23 and 32 furnish signals causing the counter circuit 27 to provide an output value of greater than one. This value is used to enable a clock circuit 43 and disable the clock circuit 37 to change the clock value furnished to the subtractor circuit 36. In the example illustrated, the clock value furnished by the circuit 43 is one-third that of the regular clock signal so that the value in the time remaining register 25 is decremented by only one-third of the regular value (for example, one-third of a minute for each minute television is viewed). Obviously, a value other than one-third might be utilized. In like manner, the value from the counter circuit 27 enables the clock circuit 43 and disables the clock circuit 37 to change the clock value furnished to the subtractor circuit 40 to one-third that of the regular clock signal so that the value in the time remaining register 34 is decremented by only one-third of the regular value.

The two values from the subtractor circuits 36 and 40 are added by the adder 38 to provide a combined viewing time which is reduced by two-thirds of the value of the time which has actually passed. This allows the users to view the television receiver 36 for a longer period of time when they cooperate in their viewing. The values from the subtractor circuits 36 and 40 are also returned to the identification/time store circuit 20 and reduce the values stored therein for the individual users by one-third of their actual viewing times when used in cooperation with another viewer. It will thus be understood by those skilled in the art that the present invention function to both limit the time during which individual viewers may view a television receiver but also encourages the viewers to cooperate in their viewing in order to obtain more viewing time. The invention is especially useful in eliminating the family quarrels that often arise in attempts to limit television viewing. It eliminates the need for parents to enforce time limits and teaches a child to act responsibly to determine what he will view.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An arrangement for limiting the time an authorized viewer may view a television program on a television receiver comprising means for sensing a value stored in a transportable magnetic medium, means operating in response to the sensing of a value stored in the transportable magnetic medium for providing a signal indicative of the time remaining to the authorized viewer, means responsive to an indication that time remains to the viewer to enable the transmission of television signals to a television receiver, and means for changing the value stored in the transportable magnetic medium to reduce the time remaining to the viewer incrementally with the passage of time.

2. An arrangement for limiting the time an authorized viewer may view a television program on a television receiver as claimed in claim 1 further comprising means for sensing a value stored in a second transportable magnetic medium for providing a signal indicative of the time remaining to a second authorized viewer, means responsive to an indication that time remains to the second viewer to enable the transmission of television signals to television receiver, and means for changing the value stored in the second transportable magnetic medium to reduce the time remaining to the second viewer incrementally with the passage of time.

3. An arrangement for limiting the time an authorized viewer may view a television program on a television receiver comprising means for sensing a value stored in a transportable magnetic medium, means operating in response to the sensing of a value stored in the transportable magnetic medium for providing a signal indicative of the time remaining to the authorized viewer, means responsive to an indication that time remains to the viewer to enable the transmission of television signals to a television receiver, means for reducing the signal indicating the time remaining to the viewer with the passage of time, means for sensing a value stored in a second transportable magnetic medium for providing a signal indicative of the time remaining to a second authorized viewer, means responsive to an indication that time remains to the second viewer to enable the transmission of television signals to a television receiver, means for reducing the signal indicating the time remaining to the second viewer with the passage of time, and means for combining the time remaining to the authorized viewers to control the time during which the transmission of television signals is enabled.

4. An arrangement for limiting the time an authorized viewer may view a television program on a television receiver as claimed in claim 3 in which the means for reducing the signal indicating the time remaining to the viewer with the passage of time reduces the time less when multiple authorized viewers are using the arrangement.

* * * * *

UNITED STATES PATENT AND TRADEMARK OFFICE
CERTIFICATE OF CORRECTION

PATENT NO. : 5,060,079
DATED : October 22, 1991
INVENTOR(S) : Rufus-Isaacs

It is certified that error appears in the above-identified patent and that said Letters Patent is hereby corrected as shown below:

In column 3, at line 32 change "chid" to -- child --

Signed and Sealed this

Fourth Day of April, 1995

Attest:

BRUCE LEHMAN

Attesting Officer

Commissioner of Patents and Trademarks